United States Patent
Kremer et al.

(10) Patent No.: US 11,859,905 B2
(45) Date of Patent: Jan. 2, 2024

(54) DEVICE FOR PRODUCING EXPANDED GRANULATED MATERIAL

(71) Applicant: Omya International AG, Oftringen (CH)

(72) Inventors: Hartmut Kremer, Wernberg (AT); Julian Neubacher, Graz (AT); Harald Tschernko, Gleisdorf (AT)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 18/016,750

(22) PCT Filed: Aug. 21, 2020

(86) PCT No.: PCT/EP2020/073567
§ 371 (c)(1),
(2) Date: Jan. 18, 2023

(87) PCT Pub. No.: WO2022/037796
PCT Pub. Date: Feb. 24, 2022

(65) Prior Publication Data
US 2023/0228489 A1    Jul. 20, 2023

(51) Int. Cl.
*F27B 1/20* (2006.01)
*C04B 20/06* (2006.01)
*F27B 1/24* (2006.01)

(52) U.S. Cl.
CPC .............. *F27B 1/20* (2013.01); *C04B 20/066* (2013.01); *F27B 1/24* (2013.01)

(58) Field of Classification Search
CPC ..... C04B 20/066; F27B 1/14; F27D 2001/005
See application file for complete search history.

(56) References Cited

U.S. PATENT DOCUMENTS

| 4,254,221 A | 3/1981 | Beckenbach |
| 4,427,372 A | 1/1984 | Takesue et al. |

(Continued)

FOREIGN PATENT DOCUMENTS

| CA | 2987788 A1 | 12/2016 |
| CA | 3054952 A1 | 10/2018 |

(Continued)

OTHER PUBLICATIONS

CN-207079173-U English translation (Year: 2018).*
International Search Report in PCT/EP2020/073567, dated Dec. 4, 2020.

*Primary Examiner* — Michael G Hoang
*Assistant Examiner* — Kurt J Wolford
(74) *Attorney, Agent, or Firm* — Collard & Roe, P.C.

(57) ABSTRACT

A device for producing expanded granulated material from mineral material in the form of grains of sand with an expanding agent includes a furnace with a furnace shaft, having an upper end and a lower end. A conveying section extends between the two ends and passes through a number of heating zones arranged separately from one another in a conveying direction. The device also includes at least one feeder in order to charge at least the unexpanded material into the furnace shaft at one of the two ends in the direction of the other of the two ends. At least one directing element is at least partly arranged in the furnace shaft and forms a gap with an inner wall of the furnace shaft, at least in the region of one of the two ends. The at least one feeder is designed for charging the material into the gap.

18 Claims, 2 Drawing Sheets

(56) References Cited

U.S. PATENT DOCUMENTS

Figure 1:
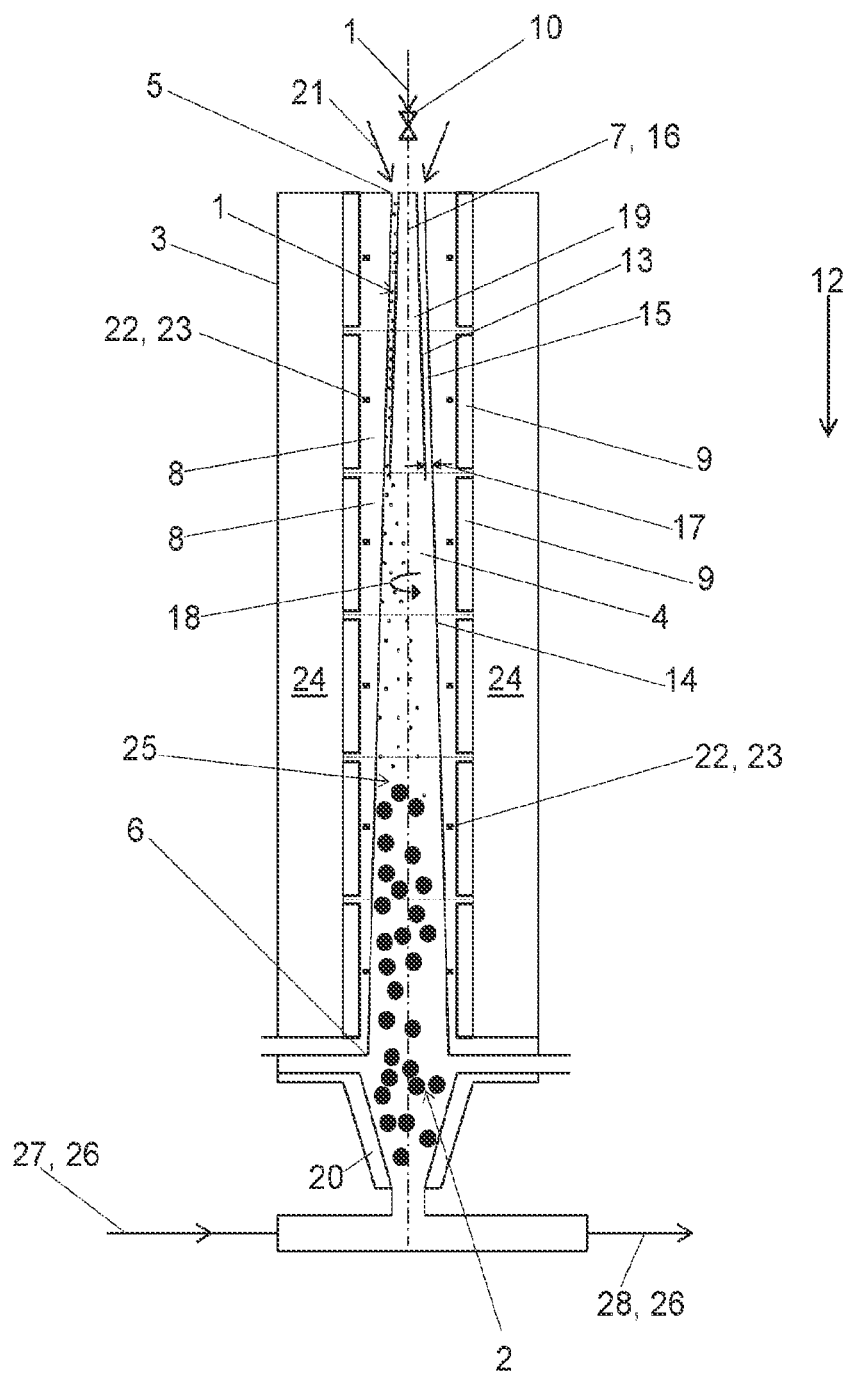

| | | |
|---|---|---|
| 9,809,495 B2 | 11/2017 | Brunnmair |
| 10,611,686 B2 | 4/2020 | Brunnmair et al. |
| 2016/0305710 A1 | 10/2016 | Brunnmair |
| 2017/0107146 A1 | 4/2017 | Tschernko et al. |
| 2020/0071229 A1 | 3/2020 | Brunnmair et al. |
| 2021/0396471 A1 | 12/2021 | Pohl |

FOREIGN PATENT DOCUMENTS

| | | |
|---|---|---|
| CA | 3153978 A1 | 10/2022 |
| CN | 101975508 B | 7/2012 |
| CN | 207079173 U * | 3/2018 |
| CN | 211668259 U | 10/2020 |
| EP | 0 007 977 A1 | 2/1980 |
| EP | 2 708 517 A1 | 3/2014 |
| JP | S5512395 A | 1/1980 |
| JP | S57001436 A | 1/1982 |
| JP | S63282481 A | 11/1988 |
| JP | 2014534942 A | 12/2014 |
| JP | 2018520080 A | 7/2018 |
| JP | 2020517557 A | 6/2020 |
| KR | 100764453 B1 | 10/2007 |
| RU | 2652608 C1 | 4/2018 |
| RU | 2709570 C2 | 12/2019 |
| SU | 423994 A1 | 4/1974 |
| SU | 1384902 A1 | 3/1988 |
| WO | 2012/060157 A1 | 5/2012 |
| WO | 2012060157 A1 | 5/2012 |
| WO | 2013/053635 A1 | 4/2013 |
| WO | 2015184482 A1 | 12/2015 |
| WO | 2016/191788 A1 | 12/2016 |
| WO | 2018/191763 A1 | 10/2018 |
| WO | 2019/210338 A1 | 11/2019 |

* cited by examiner

DEVICE FOR PRODUCING EXPANDED GRANULATED MATERIAL

CROSS REFERENCE TO RELATED APPLICATIONS

This application is the National Stage of PCT/EP2020/073567 filed on Aug. 21, 2020, the disclosure of which is incorporated by reference. The international application under PCT article 21(2) was not published in English.

FIELD OF THE INVENTION

The present invention relates to a device for producing an expanded granulated material from mineral material in the form of grains of sand with an expanding agent, for example for producing an expanded granulated material of perlite or obsidian sand with bound water as expanding agent, the device comprising a furnace with a substantially vertically positioned furnace shaft having an upper end and a lower end, wherein a conveying section extends between the two ends and passes through a plurality of heating zones arranged separately from one another in a conveying direction, wherein the heating zones each comprise at least one heating element which can be controlled independently of one another in order to heat the material in particular to a critical temperature and to expand the sand grains, wherein furthermore at least one feeding means is provided, which is adapted to feed at least the unexpanded material at one of the two ends of the furnace shaft into the furnace shaft in the direction of the other of the two ends of the furnace shaft in order to expand the material in the last half, preferably in the last third, of the conveying section, as viewed in the conveying direction, wherein at least one directing element is provided, which is arranged at least in sections in the furnace shaft, wherein the directing element forms a gap with an inner wall of the furnace shaft at least in the region of the one of the two ends of the furnace shaft, wherein the at least one feeding means is adapted for feeding the unexpanded material into the gap.

From WO 2013/053635 A1 a method and a device for the, in particular closed-cell, expansion of sand-grain-shaped mineral material containing an expanding agent—such as bound water—are known. In this process, the material is fed from above into a furnace having a substantially vertical furnace shaft. By means of gravity, the material is conveyed through the furnace shaft from its upper end to its lower end along a conveying section in a conveying direction. The conveying section passes through several heating zones arranged separately from each other in the conveying direction and equipped with independently controllable heating elements in order to heat the material to a critical temperature and to expand the sand grains. The expanded granulated material is discharged at the bottom end. Due to buoyancy forces occurring in the furnace shaft, which are triggered, among other things, by the chimney effect of the furnace shaft and have different effects due to the different densities before and after expansion, this type of expanding is suitable for raw sands with grain sizes typically greater than or equal to 75 µm, in particular greater than or equal to 100 µm. For finer grains, the buoyancy forces become too great for a reliable expanding result. In addition, with fine grain sizes there is an increased risk of agglomeration on the inner wall of the furnace shaft because particles that are too light or have too low a density remain suspended in the heating zone for too long. In this case, the particles continue to absorb energy after expansion and soften again without isenthalpic shape change leading to cooling, which in turn significantly increases the risk of agglomeration on the inner wall of the furnace shaft. This danger increases as the grain band becomes narrower, since—figuratively speaking—there are no longer enough coarser and thus at the same time heavier particles to pull the finer particles along against the buoyancy forces.

In order to expand raw sands with finer grain sizes, it is known from WO 2016/191788 A1 as well as WO 2018/191763 A1 to feed or inject the material together with a quantity of air from the bottom to the top into the furnace shaft and to convey it through the furnace shaft. It has been recognized that when feeding very fine grains in combination with blowing in, different flows have to be synchronized in order to subsequently obtain a uniform flow profile through the furnace shaft and to avoid turbulence, since this favors agglomerations on the shaft wall. Such agglomerations, in turn, cause successive "overgrowth" of the shaft and, consequently, obstruction of the heat radiation, which in turn leads to poorer expansion results.

From WO 2012/060157 A1 a vertically positioned furnace for firing lime, in particular limestone and dolomite, is known. The furnace has an outer tube and an inner tube between which the material to be burned moves (due to gravity), wherein the material is introduced between the outer tube and the inner tube. This means that the tubes form a kind of gap between them into which the material is fed, wherein the material is introduced into the furnace from above by means of a feeding device.

From EP 0007977 A1 a method as well as an annular shaft furnace for firing lumpy firing material such as limestone, dolomite, magnesite or the like are known, wherein the annular shaft and the inner shaft are alternately charged with fresh air and firing gases and connected to the exhaust gas discharge, respectively. The annular gap and the inner shaft are formed by a shaft insert in the furnace shaft.

OBJECT OF THE INVENTION

It is therefore the object of the present invention to provide a device for the production of an expanded granulated material which overcomes the above-mentioned disadvantages. In particular, the device is intended to enable the expansion of raw sands with fine grain sizes, preferably with grain sizes less than or equal to 120 µm, particularly preferably with grain sizes in the range from 50 µm to 100 µm, and narrow grain band, preferably with an expansion product that is as uniform as possible.

SUMMARY OF THE INVENTION

In order to solve the aforementioned problem, it is provided according to the invention in a device for producing an expanded granulated material of sand-grain-shaped mineral material with an expanding agent, for example for producing an expanded granulated material of perlite or obsidian sand with bonded water as an expanding agent, the device comprising a furnace with a substantially vertically disposed furnace shaft which has an upper end and a lower end, wherein a conveying section extends between the two ends and passes through a plurality of heating zones arranged separately from one another in a conveying direction, wherein the heating zones each have at least one heating element which can be controlled independently of one another in order to heat the material at least to a critical temperature and to expand the sand grains, wherein at least one feeding means is furthermore provided which is adapted to feed at least the unexpanded material at one of the two ends of the furnace shaft into the furnace shaft in the direction of the other of the two ends of the furnace shaft in order to expand the material, as viewed in the conveying direction, in the last half, preferably in the last third, of the conveying section, wherein at least one directing element is provided, which is arranged at least in sections in the furnace shaft, wherein the directing element forms a gap with an inner wall of the furnace shaft at least in the region of the one of the two ends of the furnace shaft, wherein the at least one feeding means is adapted for feeding the unexpanded material into the gap, wherein releasable fastening means are provided for the at least one directing element in order to be able to remove the at least one directing element from the furnace shaft and reinsert it as required.

The conveying direction is parallel to the vertical or the plumb direction and can be from top to bottom or, conversely, from bottom to top. This means that the at least one directing element may be provided both when feeding the material from above and when feeding the material from below. In the case of feeding from above, the material to be expanded is at least partially conveyed along the conveying section by means of gravity. When feeding from below, the material to be expanded is typically fed into the furnace shaft together with a quantity of air and conveyed through the furnace shaft.

The heating elements can be used to define the heating zones, since different heating zones must each have at least one heating element, and these heating elements must be independently controllable.

For the sake of completeness, it is noted that, as viewed in the conveying direction, the last half is the second half, or the last third is the third third.

In principle, a single directing element can be provided. This can be made up of several parts, wherein several smaller directing elements can also jointly form a larger directing element or be integrated into it. However, several separate directing elements can also be provided.

The at least one directing element is made of one or more materials capable of withstanding the temperatures encountered in the furnace shaft. Said materials can e.g. be metals, in particular stainless steels or nickel-based alloys, or carbon fiber or ceramics, in particular advanced ceramics.

It should be noted that the directing element does not have to be arranged completely in the furnace shaft, but can also protrude from the furnace shaft in sections without this impairing the function of the directing element, as described in more detail below. For example, a part of the directing element can be provided at the upper and/or lower ends of the furnace shaft to protrude from the latter for fastening purposes.

However, it can of course also be provided that the at least one directing element is arranged completely in the furnace shaft, and is only fastened within it.

The inner wall delimits the furnace shaft. The directing element is spaced from the inner wall of the furnace shaft so that the gap is formed at least in the region of the one of the two ends of the furnace shaft, i.e. in the region of the end of the furnace shaft intended for the feed of the material to be expanded, wherein the gap is preferably an annular gap. "Annular gap" is to be understood here in particular as circumferential, without this implying any restriction to a circular shape.

As the gap is now formed—by the at least sectional arrangement of the directing element in the furnace shaft—and the unexpanded material is fed via the gap, the material or feed material is thus kept away from the radial center of the furnace shaft at least in the region of the start of the conveying section. Here and in the following, "radial" is to be understood independently of the concrete cross-sectional shape of the furnace shaft. This means that regardless of whether the cross-section of the furnace shaft normal to the conveying section or conveying direction is circular or not—for example, if the cross-section is elliptical, rectangular, or square—its center is referred to as the radial center or radial middle. Accordingly, a radial direction points outward from the radial center.

In particular, if the feed is from above, an upwardly directed flow of heated air/gases ("chimney flow") caused by the stack effect typically occurs in the region of the radial center of the furnace shaft, which impedes the conveying of the material by means of gravity. However, said air/chimney flow cannot hit and influence the material in the gap.

In addition, since it concerns a gap and not merely an opening (especially annular), the material is directed into and within the furnace shaft.

Said directing can extend over the entire conveying section, in particular if the directing element extends over the entire conveying section. Typically, the length of the conveying section can be in a range from 3 m to 20 m, preferably from 5 m to 15 m, particularly preferably from 6 m to 10 m.

If the directing element—and thus also the gap—extends over only part of the conveying section, for example only over a few meters, the material is on the one hand guided in the gap over said part of the conveying section. On the other hand, in this case a certain directing effect is typically still noticeable at least a little way after the end of the directing element due to the forced uniformity of the movement, in particular the direction of movement, of the individual material grains in the gap. Accordingly, in the case of the feed from above, the material can be prevented from coming into contact with the above-described air flow in the radial center even a short distance after it has left the gap.

However, the flow conditions and thus the residence time of the particles as well as the heat transfer to the particles in the furnace shaft can also be specifically influenced by means of the at least one directing element when feeding from below.

Due to the relatively narrow gap and the resulting increased flow velocities (turbulent flow for Reynolds number $Re>10^4$), flows forming in the region of the gap, in particular annular gap flows, favor heat transfer to the transport gas and thus also to the particles. Due to the mixing in turbulent flows, the heat transfer is greater than in laminar flow (heat transfer coefficient $\alpha$ becomes larger).

This means that the directing element favors the expansion of very fine and narrow feed fractions of the material, which in particular may have diameters less than or equal to 120 µm, preferably less than or equal to 100 gm.

Another effect of the directing element is that the entire material or feed material, at least at the beginning of the conveying section, moves very dose along the inner wall and thus relatively dose to the heating elements. This results in uniform heating of all grains of the material in terms of time and location, which in turn leads to uniform expansion results. This applies both to feed from above and to feed from below.

Furthermore, the directing element causes the feed material to be irradiated both by the actively heated outer side of the oven or oven shaft and by the directing element itself, because the directing element reflects or absorbs part of the radiation energy and then emits it again. This means that the directing element can act as a passive heating source. The degree of reflection or emission can depend on the design of the directing element, in particular on the directing element material, so that the directing element forms a passive heat source that can be adjusted to a certain degree.

The directing element thus has multiple positive effects on the expansion result, which can reinforce each other.

It has been recognized that different feed fractions of the material to be expanded can each require a different optimum directing element length, which can typically be between one and several meters. Accordingly, in a preferred embodiment of the device according to the invention, it is provided that the at least one directing element, as viewed in the conveying direction, extends at most to the end of the first half, preferably at most to the end of the first third, particularly preferably at most to the end of the first quarter, of the conveying section. In accordance with the above, the directing element can thereby start from one of the two ends of the furnace shaft or in the region of one of the two ends of the furnace shaft or from outside one of the two ends of the furnace shaft.

The aforementioned limitation of the maximum extension of the directing element as viewed in the conveying direction can be provided in particular in embodiments with feeding of the material to be expanded from above.

Alternatively or additionally, a minimum length of the directing element can be provided in order to achieve an optimum expansion result depending on the feed fraction. This minimum length can be provided in particular for embodiments where the material to be expanded is fed from below.

Accordingly, in a preferred embodiment of the device according to the invention, it is provided that the at least one directing element extends over at least a quarter of the conveying section, preferably over at least a third of the conveying section, particularly preferably over the entire conveying section.

In a preferred embodiment of the device according to the invention, it is provided that the gap, as viewed along the conveying direction, extends fully circumferentially at least in sections around a radial center of the furnace shaft. Accordingly, the material to be expanded can be introduced into the furnace shaft without any problems and, if required, also in very large quantities simultaneously from all sides, in particular evenly distributed over the entire cross-section of the gap or annular gap, which permits very high expansion or production rates.

If the directing element is fastened exclusively outside the furnace shaft, the gap can also be designed to be fully circumferential with respect to the radial center of the furnace shaft over the entire extension of the directing element in the conveying direction, which allows maximum utilization of space in the furnace shaft. If, on the other hand, fastening elements are required for the directing element in the furnace shaft, the gap can still be designed in sections along the conveying direction—namely in the section or sections where no fastening elements are present—fully around the radial center of the furnace shaft.

Preferably, where the gap around the radial center of the furnace shaft extends all the way around, i.e. through an angular range of 360°, the directing element is radially, i.e. in the radial direction, tight, in particular gas-tight. In accordance with the above, this applies regardless of whether the cross-section of the furnace shaft is circular or not. Accordingly, the course of the gap does not have to be circular, but can also be elliptical, rectangular or square, for example.

It should be noted at this point that in general the radial center of the furnace shaft and a radial center of the baffle plate can coincide. A radial center of the baffle plate can be assumed even if the baffle plate does not completely surround this radial center. Optionally, the baffle plate can be continued mentally so that it surrounds the radial center over the entire 360°.

In a preferred embodiment of the device according to the invention, it is provided that the gap has a gap width which varies in the conveying direction by at least 50%, preferably by at least 65%, particularly preferably by at least 80%, wherein the gap width is preferably at most 10 cm. The gap width corresponds to a distance between the inner wall of the furnace shaft and the directing element or a surface of the directing element facing the inner wall.

Preferably, the gap width can be measured in radial direction or in a direction normal to the directing element and/or to the inner wall. In particular, the gap width for a point on the surface of the baffle plate facing the inner wall can be determined as the shortest distance between this point and the inner wall of the furnace shaft.

By varying the gap width in the conveying direction—i.e. via the extension of the directing element in the conveying direction in the region where the gap is formed—the residence time of the sand grains along the conveying section can be specifically influenced or adjusted. In particular, by increasing the gap width in a certain region of the conveying section, a longer residence time can be set than in regions with a smaller gap width and vice versa.

However, it is of course also conceivable in principle to have embodiments in which the gap width hardly varies in the conveying direction or is essentially constant.

In any case, the shape of the directing element can be adapted to the shape of the cross-section of the furnace shaft accordingly.

The specified variation range can typically be related to an average value of the gap width in the conveying direction or to a minimum or maximum gap width, the latter in particular in the case of the possible maximum gap width mentioned.

In accordance with the above, a relative dimensioning of the gap is generally sensible, i.e. without specifying exact centimeter values. In some cases, however, dimensioning based on absolute values can be useful. The above-mentioned possible design with a maximum gap width of 10 cm can produce particularly good or uniform expansion results for certain feed fractions, especially in designs where the material to be expanded is fed from above.

Similarly, in a preferred embodiment of the device according to the invention, it is provided that the gap has a gap width which varies in a circumferential direction around a radial center of the furnace shaft by at most 35%, preferably by at most 10%, particularly preferably by at most 5%, with the gap width preferably being at most 10 cm.

The specified variation range can typically be related to an average value of the gap width in the circumferential direction or to a minimum or maximum gap width, the latter in particular in the case of the possible maximum gap width mentioned.

The small variation of the gap width in the circumferential direction proves to be advantageous for a good and uniform expansion result, wherein turbulence and thus caking of the sand grains can be avoided particularly well.

It is understood that embodiment variants are also conceivable in which the gap with does not vary at all in the circumferential direction or is essentially constant.

In a preferred embodiment of the device according to the invention, it is provided that, at least along a portion of the conveying section, the furnace shaft has, transversely, in particular perpendicularly, to the conveying direction an at least sectionally round, preferably a substantially circular or substantially elliptical, cross-section which is bounded by the inner wall. While the circular cross-section is the most stable with regard to distortion stresses, in the case of the ellipse the ratio of circumference to cross-sectional region is significantly better in the sense that more "circumferential region" (of the inner wall) is available for energy radiation.

The cross-section of the furnace shaft is clearly to be understood without the optionally provided directing element.

"Substantially" should be understood to mean that certain deviations from mathematically perfect circles or ellipses are of course possible and as a rule even unavoidable—if only for manufacturing reasons. Optionally, slight deviations from the mathematically perfect circle or ellipse shape may also be intentionally provided for.

Preferably, the furnace shaft constituting a cavity has the said cross-sectional shape along the entire conveying section.

In sections, the cross-sectional shape may deviate from the round/circular/elliptical shape mentioned, e.g. in that such sections or subsections are connected by rectilinear sections or subsections. It is understood that the cross-sectional shape can also be perfectly round/circular/elliptical along at least one portion of the conveying section.

Transitions from cross-sectional shape to cross-sectional shape are preferably designed in such a way that there is no turbulence of the flow forming in the furnace shaft.

Alternatively or additionally, the cross-section may have corners. Accordingly, it is provided in a preferred embodiment of the device according to the invention that at least along a portion of the conveying section the furnace shaft has transversely, in particular perpendicularly, to the conveying direction an at least partially angular, preferably a substantially rectangular or substantially square, cross-section which is bounded by the inner wall. The relatively large cross-sectional circumference in relation to the cross-sectional region can prove to be favorable, since this can create space for heating elements with a correspondingly large region and more area can be made available for energy transfer to the material to be expanded than would be the case with a purely round or even circular cross-section.

The cross-section of the furnace shaft is again clearly to be understood without the optionally provided directing element.

"Substantially" should be understood to mean that certain deviations from mathematically perfect rectangles or squares are, of course, possible and, as a rule, even unavoidable—if only for manufacturing reasons. Optionally, slight deviations from the mathematically perfect rectangular or square shape may also be deliberately provided for. In particular, rounded corners are possible in practice.

Preferably, the furnace shaft constituting a cavity has said cross-sectional shape along the major part of the conveying section, preferably along the entire conveying section.

In sections, the cross-sectional shape may deviate from the said angular/rectangular/square shape, e.g. in that such sections or partial sections are connected by round sections or partial sections. It is understood that the cross-sectional shape can also be completely angular/rectangular/square along at least one portion of the conveying section.

Transitions from cross-sectional shape to cross-sectional shape are preferably designed in such a way that there is no turbulence of the flow forming in the furnace shaft.

In a preferred embodiment of the device according to the invention, it is provided that the inner wall is formed by at least one limiting element, which is preferably made of high-temperature steel, and that the at least one directing element is made of the same material as the at least one limiting element. Said choice of material ensures that the same performance requirements are met for the limiting element as for the directing element. Furthermore, the same choice of material also results in the same coefficients of thermal expansion, whereby distortion due to different thermal expansion can be avoided and a consistent gap shape can be ensured.

Preferably, the furnace is constructed of one or more other materials, in particular thermally insulating materials, when viewed in the radial direction behind the limiting element.

High-temperature steel is a well-known type of stainless steel.

On the one hand, the limiting element makes it possible to ensure in a structurally simple manner that the material fed into the furnace shaft cannot come into contact with heating elements which, as viewed in the radial direction, are arranged behind the limiting element. On the other hand, the at least one limiting element makes it very easy to realize a desired cross-sectional shape of the furnace shaft and, optionally, to adapt it to different applications.

The correct or suitable choice of material for the limiting element allows it to be used in all temperature ranges that play a role in practice without impairing or even damaging the functionality of the limiting element. When expanding perlite or obsidian, metallic materials in particular come into consideration. In this context, it would also be conceivable—especially for other minerals requiring a higher calcining temperature—to manufacture the element not from metal but from another suitable material, e.g. carbon fiber or (high-performance) ceramics.

As already mentioned several times, embodiments can be provided in which the material to be expanded is fed into the furnace shaft from below. Accordingly, in a preferred embodiment of the device according to the invention, it is provided that the at least one feeding means is arranged to suck the unexpended material together with a quantity of air at the lower end of the furnace shaft in the direction of the upper end of the furnace shaft in such a way that the quantity of air forms an air flow flowing from bottom to top, by means of which the material is conveyed from bottom to top along the conveying section in order to be expanded in the upper (or second) half, preferably in the uppermost (or third) third, of the conveying section.

It would be conceivable, for example, to draw in the air volume by means of a vacuum source or a fan through an (intake) nozzle connected upstream of the furnace shaft and to feed the material, e.g. by means of a chute, to the air flow entering the nozzle. This means that the at least one feeding means can comprise e.g. said nozzle as well as means known per se for generating or sucking in the air volume—for example a vacuum source and/or an (air) fan, wherein the vacuum source or the fan is/are connected downstream of the furnace shaft—as well as the chute. In this case, the material can be fed in a metered manner.

In a particularly preferred embodiment of the device according to the invention, it is accordingly provided that the at least one feeding means comprises et least one suction nozzle connected upstream of the furnace shaft, and preferably a diffuser connected downstream of the suction nozzle.

In particular, the diffuser may be designed to disperse the material in the air volume prior to the expansion process and to reduce the relatively high flow velocities at the intake nozzle.

As already mentioned several times, embodiments can be provided in which the material to be expanded is fed into the furnace shaft from above. Accordingly, in a preferred embodiment of the device according to the invention, it is provided that the at least one feeding means is adapted to feed the unexpended material into the furnace shaft at the upper end of the furnace shaft in the direction of the lower end of the furnace shaft in such a way that the material is conveyed from top downward along the conveying section at least by means of gravity in order to be expanded in the lower half, preferably in the lowest third, of the conveying section.

Accordingly, the at least one feeding means may comprise, for example, a chute for feeding the material to be expanded.

The at least one feeding means can preferably further comprise at least one, in particular controllable, valve for the material in order to enable a particularly precise metering of the material.

In addition to gravity, other feed or conveying means may be provided, such as a process air or gas flowing from the top down or being blown or sucked into the furnace shaft.

For the sake of completeness, it should be mentioned that due to the knowledge that the expansion process is an isenthalpic process that is accompanied by a drop in temperature, the latter can be specifically detected or localized—regardless of whether the material to be expanded is fed into the furnace shaft from above or below. In particular, this can in turn be used to determine a temperature treatment of the expanded sand grains after the actual expansion process in order to influence the surface properties of the expanded sand grains. For example, a renewed heating above the critical temperature can be prevented to prevent cracking of the surface. Or such a renewed temperature rise can be deliberately initiated if a tearing of the surface of the sand grains is to be deliberately accepted or even achieved.

As mentioned, in the device according to the invention, it is provided that releasable fastening means are provided for the at least one directing element in order to be able to remove the at least one directing element from the furnace shaft and reinsert it as required. This means that the directing element is removable or reinsertable.

This makes the device far more universally applicable, since on the one hand the directing element can be completely removed without difficulty if feed fractions with very coarse grain sizes, in particular with diameters of several hundred micrometers or more, are to be expanded. On the other hand, of course, different directing elements that are optimally matched to the respective feed fraction can also be installed/removed or converted as required without any problems.

Typically, the removal or installation of the respective directing element is carried out at a relatively low temperature, in particular at room temperature, possibly waiting for the device to cool down first after a production process.

For the sake of good order, it should be noted that, as usual, "releasable" should be understood to mean "non-destructively releasable", which implies reusability.

Appropriate fastening means are sufficiently well known. In particular, a wide range of different screw connections and/or known positive-locking connections such as hook-and-eye combinations, locking bolts or bayonet locks or any combination of such connections can be used as suitable fastening means.

As already explained above, the directing element can be made of a wide variety of materials. In a preferred embodiment of the device according to the invention, it is provided that the at least one directing element is made of metal, in particular of high-temperature steel. On the one hand, this ensures that the directing element can be used in all temperature ranges which play a role in practice during expansion, in particular of perlite or obsidian, without the directing element being impaired in its function or even coming to damage. On the other hand, the above-mentioned choice of material for the directing element results in particularly good reflection or emission of the heat or thermal radiation caused by the heating elements. This means that the directing element is thus optimally suited as a passive heating source, as already explained in more detail above, which saves energy and costs.

In a preferred embodiment of the device according to the invention, it is provided that a free space is arranged between the at least one directing element and a radial center of the furnace shaft at least along the entire extension of the at least one directing element in the furnace shaft, preferably along the entire extension of the at least one directing element parallel to the conveying direction. In this context, it is not excluded that the directing element is shaped outside the furnace shaft in such a way that a section of the directing element is arranged in the region of the longitudinal axis of the furnace shaft, which inside the furnace shaft typically extends congruently with the radial center of the furnace shaft.

On the one hand, said free space allows air/gases, in particular the already mentioned chimney flow, to escape from the furnace shaft in the region of the radial center. On the other hand, the free space can be used to introduce forced air into the furnace shaft from outside, which can be used to influence the flow conditions in the furnace shaft and thus the residence time of the raw sand or, after expansion, of the expansion material in the furnace shaft.

BRIEF DESCRIPTION OF THE DRAWINGS

The invention will now be explained in more detail by means of exemplary embodiments. The drawings are exemplary and are intended to illustrate the idea of the invention, but in no way to restrict it or even to reproduce it conclusively.

The drawings show as follows:

FIG. 1 shows a schematic sectional view of an embodiment of a device according to the invention for the production of expanded granulated material, wherein the feeding or conveying of the granulated material to be expanded takes place from top to bottom in a furnace shaft.

FIG. 2 shows a schematic sectional view of a further embodiment of the device according to the invention, wherein the granulated material to be expanded is fed into or conveyed in the furnace shaft from the bottom to the top.

DETAILED DESCRIPTION OF THE PREFERRED EMBODIMENTS

FIG. 1 shows a device according to the invention for the production of expanded granulated material 2 from sand-grain-shaped mineral material with an expanding agent. In the exemplary embodiment shown, said material is perlite sand 1 in which water is bound (so-called water of crystallization) and acts as an expanding agent. The device comprises a furnace 3 having a substantially vertical furnace shaft 4 having an upper end 5 and a lower end 6. A conveying section 7 extends between the two ends 5, 6, indicated in FIG. 1 by a dash-dotted line (in FIG. 2 by a dashed line), wherein the dash-dotted line in FIG. 1 (in FIG. 2 the dashed line) also marks a radial center 16 of the furnace shaft 4. The conveying section 7 leads through a plurality of heating zones 8 arranged separately from one another in a conveying direction 12 (indicated by horizontal dotted lines in FIG. 1), wherein the heating zones 8 each have at least one heating element 9 which can be controlled independently of one another in order to heat the perlite sand 1, in particular, to a critical temperature and to expand the perlite sand grains 1.

In the exemplary embodiments shown, the heating elements 9 are electrically operated and can be controlled by a regulation and control unit (not shown).

The device further comprises feeding means which, in the exemplary embodiment of FIG. 1, include a valve 10 for regulating the feed of the perlite sand 1 as well as process air 21 and are adapted to feed the unexpanded perlite sand 1 (together with process air 21) at the upper end 5 of the furnace shaft 4 in the direction of the lower end 6 of the furnace shaft 4 into the furnace shaft 4 in order to expand the perlite sand 1, as viewed in the conveying direction 12, in the last half, preferably in the last third, of the conveying section 7. This means that in the exemplary embodiment of FIG. 1, the perlite sand 1 is conveyed primarily by means of gravity from top to bottom along the conveying section 7, with the process air 21 that may have been blown in or sucked in with the perlite sand 1 supporting the falling movement of the perlite sand 1.

The process air 21 flowing through the furnace shaft 4 from top to bottom is thereby heated. In principle, this can lead to an increase in the flow velocity in the furnace shaft 4, which can shorten the residence time of all perlite sand particles 1 in the furnace shaft 4. To avoid this and to compensate for the increase in the flow velocity of the first process air or to keep the flow velocity approximately constant, the furnace shaft 4 in the exemplary embodiment of FIG. 1 is designed to be wider at the bottom than at the top. This means that the cross-section of the furnace shaft 4 normal to the conveying direction 12 increases from the upper end 5 to the lower end 6.

It should be emphasized, however, that even if the perlite sand 1 is fed at the upper end 5 of the furnace shaft 4, furnace shafts 4 with a constant or approximately constant cross-section are of course also possible.

The cross-section of the furnace shaft 4 is bounded by an inner wall 14 of the furnace shaft 4, which in the exemplary embodiments shown is formed by at least one limiting element made of high-temperature steel.

The furnace shaft 4 or the furnace 3 is thermally insulated to the outside by means of a thermal insulation 24.

Temperature sensors 23 are arranged at vertically spaced positions 22, with at least one temperature sensor 23 being located in each heating zone 8. In the exemplary embodiment shown in FIG. 1, the temperature of the perlite sand 1 is thus determined via the temperature prevailing in the respective heating zone 8.

Heating elements 9 and temperature sensors 23 are connected to the regulation and control unit (not shown), which determines the position or region 25 in the furnace shaft 4 at which or in which the expansion of the perlite sand grains 1 takes place, based on the temperature data. At this position or in this region 25, a significant reduction in temperature, a temperature drop of, for example, over 100° C., of the expanded perlite sand 1 takes place. This temperature drop is a consequence of the isenthalpic expansion process of the perlite sand 1, wherein the expansion process is brought about by a softening of the surface of the perlite sand grains 1 followed by an expansion process due to the water vapor or water vapor pressure forming in the perlite sand grains 1. For example, the perlite sand 1 may have about 780° C. immediately before its expansion and only about 590° C. immediately after the isenthalpic expansion process, i.e., a temperature drop of 190° C. occurs in this example, and depending on the material, the temperature drop is typically at least 20° C., preferably at least 100° C. By means of the regulating and control unit (not shown), those heating elements 9 which, as viewed in the conveying direction 12, are located after the position or region 25 of the temperature drop can be specifically or automatically regulated so that a desired energy input can take place.

It should be noted that the aforementioned drop in temperature does not necessarily show up as a drop in temperature in this automatic regulation, but optionally as a range in which more energy is required to maintain the temperature, so that the use of the temperature sensors 23 to detect the drop in temperature can also be dispensed with.

In particular, these heating elements 9 can be regulated in such a way that no further or repeated increase in the temperature of the expanded perlite sand or granulated material 2 takes place or that it is ensured that the expanded granulated material 2 is of closed-cell configuration.

In the exemplary embodiment of FIG. 1, the expanded granulated material 2 is discharged at the lower end 6 and fed via a water-cooled chute 20 to an air entrainment/suction flow 26 operating with cool air 27. The cool air 27 or the cool air 28 with expanded perlite sand 2 is sucked in, for example, by a vacuum pump or a fan (not shown).

The device according to the invention has at least one directing element 13, which is arranged at least in sections in the furnace shaft 4, wherein the directing element 13 forms a gap 15 with the inner wall 14 of the furnace shaft 4 at least in the recon of the one of the two ends 5, 6 of the furnace shaft 4, wherein the at least one feeding means is set up for feeding the unexpanded perlite sand 1 into the gap 15.

In the exemplary embodiment of FIG. 1, the directing element 13 is arranged accordingly in the region of the upper end 5. The valve 10 and the process air 21 are set up in such a way that the perlite sand 1 is fed to the gap 15 in the region of the upper end 5. This means that the perlite sand 1 enters the furnace shaft 4 when it enters the gap 15.

It should be emphasized that in the exemplary embodiment of FIG. 1, the perlite sand 1 is introduced at the upper end 5 over the entire gap 15, but in FIG. 1, for reasons of clarity, only perlite sand 1 is shown, which is introduced into the gap 15 on the left side in the picture.

The directing element 13 shields the perlite sand 1 from an upward flow of heated air/gases ("chimney flow") which forms in the region of the radial center 16 of the furnace shaft 4. This prevents very fine granulated material with diameters smaller than 100 µm, in particular smaller than 75 µm, from being obstructed from falling by the chimney flow and from expanding as desired. The latter is caused in particular by the fact that without a directing element 13 the perlite sand particles 1—after their cooling due to the isenthalpic expansion process—are heated up again. This causes the perlite sand particles 1 to soften again, but the perlite sand particles 1 can no longer cool isenthalpically by changing their shape, thus creating an increased risk of agglomeration on the inner wall 14.

Said chimney flow can easily escape upwards from the furnace shaft 4 through a free space 19. This free space 19 is arranged or formed, along the entire extension of the directing element 13 parallel to the conveying direction 12, between the directing element 13 and the radial center 16 of the furnace shaft 4.

Furthermore, the directing element 13 guides the perlite sand 1 in a targeted manner close along the inner wall 14, resulting in a uniform heating of all perlite sand grains 1 in terms of time and location, which in turn results in a uniform expansion result.

In the exemplary embodiment of FIG. 1, the directing element 13 extends in the furnace shaft 4 from the upper end 5 to approximately the end of the first third of the conveying section 7. However, the uniformity of the movement, in particular the direction of movement, of the perlite sand grans 1 in the gap 15 brought about by the directing element 13 also acts a little way beyond the end of the directing element 13.

In the exemplary embodiments shown, the directing element 13 is made of high-temperature steel and reflects the heat radiation caused by the heating elements 9 correspondingly well. This means that the directing element 13 additionally acts as a passive heater for the perlite sand 1 located between the inner wall 14 and the directing element 13.

In the exemplary embodiment of FIG. 1, the directing element 13 is arranged completely in the furnace shaft 4 and fastened therein accordingly, with detachable fastening means (not shown) being provided for fastening in order to be able to remove the directing element 13 from the furnace shaft 4 and insert it gain as required. Apart from regions along the conveying direction 12 where said fastening means are provided, the gap 15 extends completely around the radial center 16 of the furnace shaft 4.

As can be seen from the sectional view of FIG. 1, the shape of the directing element 13 is adapted to the cross-section of the furnace shaft 4 in that the directing element 13 extends basically parallel to the inner wall 14. Accordingly, the gap 15 has a gap width 17 which, in the illustrated exemplary embodiment, varies only slightly over the entire extension of the directing element 13 in the conveying direction 12 and is preferably approximately constant. It should be noted, however, that embodiment variants are also possible in which the gap width 17 varies by at least 50% in the conveying direction 12 in order to selectively adjust the residence time of the perlite sand grains 1 in different regions along the conveying section 7.

Furthermore, in the exemplary embodiment of FIG. 1, the gap width 17 also hardly varies in the circumferential direction 18 and is preferably approximately constant. This applies to all positions or regions along the conveying section 7 over which the directing element 13 extends, in particular in the region of the feed of the perlite sand 1, i.e. in the region of the upper end 5 in the exemplary embodiment of FIG. 1. It should be noted, however, that embodiment variants are also possible in which the gap width 17 varies significantly in the circumferential direction 18, although typically clearly less than in the conveying direction 12, e.g. at most 5%.

The most obvious difference between the embodiment variant shown in FIG. 2 and that shown in FIG. 1 is the feeding of the perlite sand 1 to be expanded (not shown separately in FIG. 2 for reasons of clarity) from below into the furnace shaft 4, with the conveying direction 12 facing upward from below. Accordingly, the at least one directing element 3 is arranged in the furnace shaft 4 at least in the region of the lower end 6 of the furnace shaft 4 and forms the gap 15 there together with the inner wall 14. In this case, the at least one feeding means comprises a suction nozzle 11 connected upstream of the furnace shaft 4 and a fan 34 and is set up to suck the unexpanded perlite sand 1 together with a quantity of air at the lower end 6 of the furnace shaft 4 in the direction of the upper end 5 of the furnace shaft 4 into the furnace shaft 4 in such a way that the perlite sand 1 is fed into the gap 15. The quantity of air thereby forms an air flow flowing from bottom to top, by means of which the perlite sand 1 is conveyed from bottom to top along the conveying section 7 in order to be expanded in the upper half, preferably in the uppermost third, of the conveying section 7.

Figure 2:
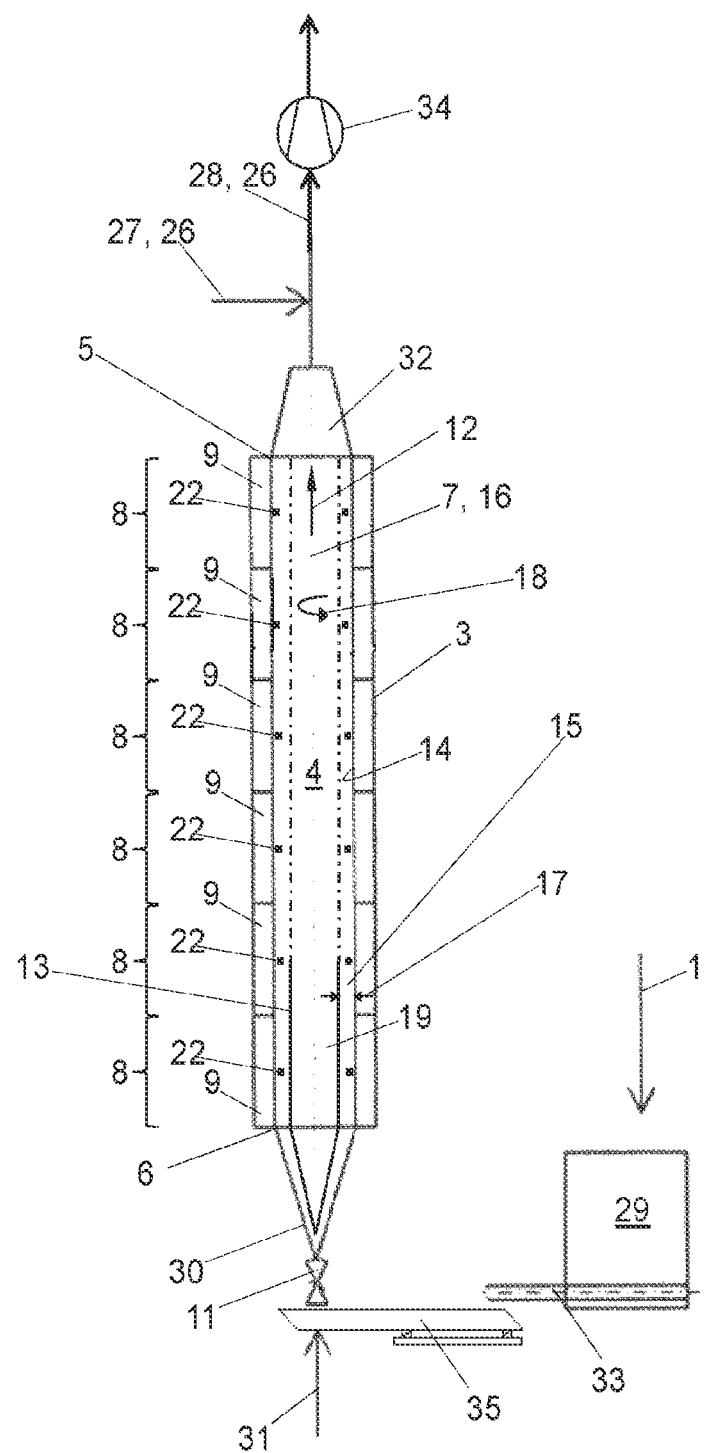

In the exemplary embodiment of FIG. 2, the feeding means further comprise a diffuser 30 downstream of the suction nozzle 11, which adjoins the lower end 6 of the furnace shaft 4. The diffuser 30 may help to disperse the perlite sand 1 in the air volume prior to the expansion process, in order to achieve or support a uniform distribution of the perlite sand 1 in the air flow.

The suction nozzle 11 is supplied with perlite sand 1 via a vibrating chute 35, with the perlite sand 1 being fed to the vibrating chute 35 in metered quantities from a supply container 29 via a metering screw 33. In addition, air is also drawn in via the suction nozzle 11 (by means of the fan 34), forming a suction air flow 31. The air flow or the suction air flow 31 can be adjusted by suitable selection or design of the suction nozzle 11 and/or by selection of a suitable suction speed (by means of the fan 34). The latter can in principle also be automated by means of the regulation and control unit (not shown).

In the exemplary embodiment of FIG. 2, the directing element 13 extends over approximately one or the first quarter of the conveying section 7 and can, however, also extend considerably further, in particular over the entire conveying section 7 in the furnace shaft 4. The latter is indicated FIG. 2 by the dashed-dotted lines.

The directing element 13 is also basically adapted to the cross-sectional shape of the furnace shaft 4 in the exemplary embodiment of FIG. 2. As in the exemplary embodiment of FIG. 1, the gap width 17 in the exemplary embodiment of FIG. 2 hardly varies in the circumferential direction 18 ands preferably essentially constant. This applies to all positions or regions along the conveying section 7 over which the directing element 13 extends, in particular in the region of the feed of the perlite sand 1, i.e. in the case of the exemplary embodiment of FIG. 2 in the region of the lower end 6. However, it should also be noted in this case that embodiment variants are also possible in which the gap width 17 varies significantly in the circumferential direction 18, although typically clearly less than in the conveying direction 12, e.g. at most by 5%.

Although FIG. 2 does not show a variation of the gap width 17 in the conveying direction 12, along the conveying section 7 or in the conveying direction 12, the gap width 17 can also vary much more than in the circumferential direction 18 in the exemplary embodiment shown in FIG. 2—for example by at least 50%—in order to specifically adjust the residence time of the perlite sand grains 1 in different regions along the conveying section 7.

In both embodiment variants shown, however, the gap width 17 is at most 10 cm.

In the exemplary embodiment of FIG. 2, the directing element 13 is fixed in the diffuser 30, preferably removably. Accordingly, as viewed along the conveying direction 12, there is an extension of the gap 15 completely around the radial center 16.

In the exemplary embodiment of FIG. 2, an absolute temperature measurement is basically carried out (temperature sensors are not shown, however, for reasons of clarity). In addition, the power consumption of the heating elements 9 is determined or it is determined how this power consumption changes along the conveying section 7. Immediately after the expansion process and the associated drop in temperature, the temperature difference between the expanded granulated material 2 (not shown separately in FIG. 2 for reasons of clarity) and the heating elements 9 is significantly greater than between the perlite sand 1 and the heating elements 9 immediately before the expansion process. Accordingly, the heat flow also increases, provided that the measured temperature is kept constant. This means that the observed change in heat flow or power consumption of the heating elements 9 from one heating zone 8 to the next is an increase, whereas due to the successive heating of the perlite sand 1 before the expansion process, the change in power consumption along the conveying section 7 is a decrease.

For regulation purposes, in particular for regulation along the conveying section 7 remaining after the temperature drop, the heating elements 9 are connected to the regulation and control unit (not shown) so that, for example, an increase in the material temperature along the remaining conveying section 7 to or above the critical temperature can be specifically prevented or enabled.

The discharge of the expanded granulated material 2 from the furnace shaft 4 takes place (together with heated air) via a collecting section 32 adjoining the upper end 5 of the furnace shaft 4. By means of an air entrainment/suction flow 26, which operates with cool air 27, the expanded granulated material 2 are conveyed further. The cool air 27 or the cool air 28 with expanded perlite sand 2 is thereby sucked in, as already mentioned, for example by a vacuum pump or a fan (not shown).

LIST OF REFERENCE SIGNS

1 Perlite sand
2 Expanded granulated material
3 Furnace
4 Furnace shaft
5 Upper end of the furnace shaft
6 Lower end of the furnace shaft
7 Conveying section
8 Heating zone
9 Heating element
10 Valve
11 Suction nozzle
12 Conveying direction
13 Directing element
14 Inner wall of the furnace shaft
15 Gap
16 Radial center of the furnace shaft
17 Gap width
18 Circumferential direction
19 Free space
20 Water-cooled chute
21 Process air
22 Position for temperature measurement
23 Temperature sensor
24 Thermal insulation
25 Position or range of the temperature drop
26 Air entrainment/suction flow
27 Cool air of air entrainment
28 Cool air with expanded perlite sand or expanded granulated material
29 Supply container
30 Diffuser
31 Suction air flow
32 Collecting section
33 Metering screw
34 Fan
33 Vibrating chute

The invention claimed is:

1. A device for producing an expanded granulated material from mineral material in the form of grains of sand with an expanding agent, the device comprising
a furnace with a substantially vertically positioned furnace shaft having an upper end and a lower end,
wherein a conveying section extends between the two ends and passes through a plurality of heating zones arranged separately from one another in a conveying direction,
wherein the heating zones each comprise at least one heating element which can be controlled independently of one another in order to heat the material at least to a critical temperature and to expand the sand grains,
wherein furthermore at least one feeding means is provided, which is adapted to feed at least the unexpanded material at one of the two ends of the furnace shaft into the furnace shaft in the direction of the other of the two ends of the furnace shaft in order to expand the material, as viewed in the conveying direction, in the last half of the conveying section,
wherein at least one directing element is provided, which is arranged at least in sections in the furnace shaft, wherein the directing element forms a gap with an inner wall of the furnace shaft at least in the region of the one of the two ends of the furnace shaft,
wherein the at least one feeding means is adapted for feeding the unexpanded material into the gap,
wherein releasable fastening means are provided for the at least one directing element in order to be able to remove the at least one directing element from the furnace shaft and reinsert it as required.

2. The device according to claim 1, wherein the at least one directing element, as viewed in the conveying direction, extends at most to the end of the first half of the conveying section.

3. The device according to claim 1, wherein the at least one directing element extends over at least a quarter of the conveying section.

4. The device according to claim 1, wherein the gap, as viewed along the conveying direction, extends fully circumferentially at least in sections around a radial center of the furnace shaft.

5. The device according to claim 1, wherein the gap has a gap width which varies in the conveying direction by at least 50%.

6. The device according to claim 5, wherein the gap width is at most 10 cm.

7. The device according to claim 1, wherein the gap has a gap width which varies in a circumferential direction around a radial center of the furnace shaft by at most 35%.

8. The device according to claim 7, wherein the gap width is at most 10 cm.

9. The device according to claim 1, wherein, at least along a portion of the conveying section, the furnace shaft has, transversely to the conveying direction, an at least sectionally round cross-section which is bounded by the inner wall.

10. The device according to claim 1, wherein at least along a portion of the conveying section, the furnace shaft has, transversely to the conveying direction, at least sectionally angular cross-section which is bounded by the inner wall.

11. The device according to claim 1, wherein the inner wall is formed by at least one limiting element, and wherein the at least one directing element is made of the same material as the at least one limiting element.

12. The device according to claim 11, wherein the at least one limiting element is made of high-temperature steel.

13. The device according to claim 1, wherein the at least one feeding means is adapted to suck the unexpanded material into the furnace shaft together with a quantity of air at the lower end of the furnace shaft in the direction of the upper end of the furnace shaft such that the air quantity forms an air flow flowing from bottom to top, by means of which the material is conveyed from bottom to top along the conveying section in order to be expanded in the upper half of the conveying section.

14. The device according to claim 13, wherein the at least one feeding means comprises at least one suction nozzle connected upstream of the furnace shaft.

15. The device according to claim 14, wherein the at least one feeding means comprises a diffuser connected downstream of the suction nozzle.

16. The device according to claim 1, wherein the at least one feeding means is adapted to feed the unexpanded material at the upper end of the furnace shaft in the direction of the lower end of the furnace shaft into the furnace shaft in such a way that the material is conveyed from top to bottom along the conveying section at least by means of gravity in order to be expanded in the lower half of the conveying section.

17. The device according to claim 1, wherein the at least one directing element is made of metal.

18. The device according to claim 1, wherein a free space is arranged between the at least one directing element and a radial center of the furnace shaft at least along the entire extension of the at least one directing element in the furnace shaft.

* * * * *